STEPPING SWITCH WARNING SYSTEM
Filed May 23, 1962
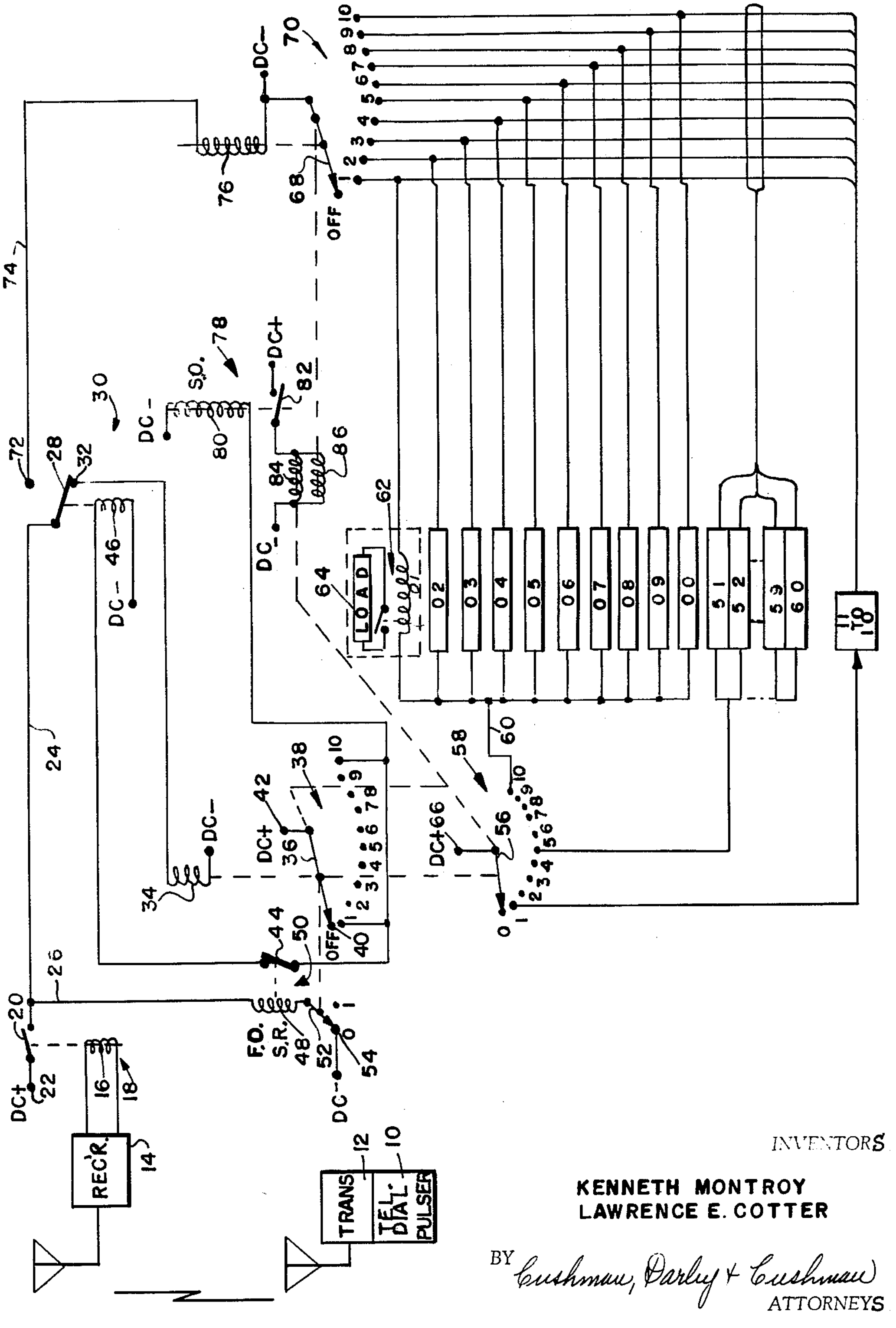
INVENTORS
KENNETH MONTROY
LAWRENCE E. COTTER
BY Cushman, Darby & Cushman
ATTORNEYS

United States Patent Office 3,202,966

Patented Aug. 24, 1965

3,202,966

STEPPING SWITCH WARNING SYSTEM

Kenneth Montroy, Morristown, N.Y., and Lawrence E. Cotter, 232 Washington St., Ogdensburg, N.Y.

Filed May 23, 1962, Ser. No. 197,079
3 Claims. (Cl. 340—164)

This invention relates to a warning system, and particularly to the circuits thereof that will selectively operate any one of a large number of devices to effect warning signals.

The system is particularly useful for civil defense work, but it will be apparent that it may be employed in other applications.

In a specific example, the invention contemplates a telephone type dial at a main transmitter station, such as any regular radio or television station in the country, for transmitting during emergency times a coded signal that can be received and effectively decoded at any one of a number of receiver stations set up to accomplish the ends desired. At each receiving station the signal is decoded and accordingly directed to any one of the different type warning devices connected to the system. Stepping type switches are employed to give up to 100 different circuits that may be uniquely selected by the transmitting station. A two-digit code is effected by the telephone type dialing to give a reasonably elaborate type of coding and thus practically eliminate the possibility of any of the warning devices being triggered by spurious transmissions.

It is, therefore, an object of this invention to provide a new and improved warning system employing a plurality of stepping switches actuatable in accordance with a transmitted multidigit code for operating any desired one of a multiplicity of different devices for effecting warning signals.

Further objects of this invention will become apparent to those of ordinary skill in the art upon reading the appended claims and the following detailed description of the invention, in conjunction with the attached drawing.

In the specific embodiment illustrated in the drawing, the telephone type dial pulser 10 as associated with transmitter 12, is utilized to effect transmission to receiver 14 of first and second pulse trains each of which have a variable number of pluses. Specifically, each pulse train may include one through ten pulses, in the same manner as the pulse trains that are effected by dialing the conventional telephone dial, to designate respectively numbers 1 through 9 and 0. As exemplary, each pulse may be 50 milliseconds in duration and the successive pulses in a train may recur every 100 milliseconds.

As the first pulse train is recovered by receiver 14 and provided at its output, for example as at the plate of the output tube or collector of the output transistor of the receiver, each pulse thereof energizes coil 16 of plate relay 18. Each time coil 16 is so energized, its normally-open switch contact 20 is closed, allowing the D.C. potential at terminal 22 to be conveyed on lines 24 and 26. This potential is in the form of pulses of the same type that were recovered by receiver 14, but squared more by virtue of relay 18.

The first pulse of the first pulse train, as translated by relay 18, proceeds over line 24 through the transfer switch arm 28 of relay 30, to transfer contact 32 and solenoid 34. The armature of this solenoid is mechanically connected as shown by dash line, to the wiper or movable arm 36 of stepping switch 38. As soon as the first pulse effectively causes arm 36 to move off of the "off" contact 40 and onto the first of the other ten stationary contacts of stepping switch 38, energy is supplied by the potential at the wiper pivot terminal 42, via arm 36, to relay contact 44. This is a normally-closed contact which is now open, for reasons presently explained, so the coil 46 of relay 30 does not become energized at this time. Its transfer arm 28 therefore stays in its normal position against transfer contact 32 while the remainder of the pulses in the first pulse train are delivered to line 24.

As above indicated, relay contact 44 is open by the time the energized arm 36 can supply a potential to that contact. This is because the first pulse of the first pulse train, as that first pulse is supplied over line 26, energizes coil 48 of relay 50. This relay is a fast operating one, that is, it is quickly energized to open its contact 44. On the other hand, relay 50 is of the slow release type. Accordingly, though coil 48 is de-energized by movement of switch 52 off terminal 54 at the same time as stepping switch arm 36 moves off contact 40, relay contact 44 does not close until a predetermined time afterwards, for example, one second later.

The number of pulses in the first pulse train causes switch arm 36 to step not only to the correspondingly numbered stationary contact, but causes movable arm 56 of stepping switch 58 to do likewise. To certain of the stationary No. 1 through No. 10 contacts of stepping switch 58, i.e., to some or all of them as required, are connected the different devices that may be utilized to effect the warning signals or such as desired. For example, connected to contact No. 10 of stepping switch 58 is a line 60 that has ten different devices designated 01 through 00 connected in parallel to it. As representative of these devices, the 01 device is detailed to show a relay 62 the contact of which when closed energizes a load 64. To cause energization of the coil of relay 62, the circuit from the potential source at terminal 66 connected to the movable arm 56 of stepping switch 58 must be returned to that source. This is accomplished, for relay 62, by the connection of movable arm 56 to stationary contact No. 10 and the connection of movable arm 68 of another stepping switch 70 to its stationary contact No. 1.

This other stepping switch 70 is controlled in accordance with the number of pulses in the second pulse train. As previously indicated, relay contact 44 closes after a predetermined time following the first pulse of the first pulse train. This time is such that contact 44 is invariably closed before the first pulse of the second pulse train arrives and closes relay contact 20. With relay contact 44 closed, the potential from terminal 42, as applied through movable arm 36 and one of the stationary contacts of stepping switch 38 and relay contact 44, energizes relay 46 to cause transfer arm 28 to move upwards against transfer contact 72 and stay there until the stepping switch arm 36 is returned to contact 40. Therefore, the second pulse train, when it arrives on line 24, is directed to line 74, and each pulse thereover successively energizes solenoid 76, causing its associated movable arm or wiper 68 to step the number of times indicated by the number of pulses in the second pulse train. Wiper arm 68 is connected at terminal 77 to the negative side of the same potential source the positive side of which is connected to wiper arm 36.

It is therefore apparent that the number of pulses in the first and second pulse trains effectively designates which set of two stationary contacts respectively of stepping switches 58 and 70 is to be coupled together so as to effect energization of the device connected between them. Each of the different devices connected between the different sets of stationary contacts of stepping switches 58 and 70, as an example, may cause different modes of operation of the same warning device, or may cause differing warning devices to operate. For example, the 01 device could cause one minute blasts of a siren, the 02 device could cause that same siren to emit eight three second blasts, device 03 could cause the same siren to emit one long and one short blast, device 04 could cause a maintenance check light to operate indicating correct operation of the system, etc. Up to 100 devices may be selectively operated by use of the two stepping switches 58 and 70.

The load 64 in the exemplary device 01 may be a fast operating slow release relay for operating a warning device, or it may be a mechanical cycling or timer unit, or the like, for effecting whatever type warning signal desired. Relay 62 is preferably a slow response relay that cannot be activated by pulses of duration less than 150 milliseconds, for example, to prevent any through connection from effectively being made while the wiper or movable arm contacts of the stepping switches are in the process of stepping.

There is also provided a means for returning each of the stepping switch arms to their respective normal or off conditions. This means takes the form of a slow operating or time delay relay 78, the coil 80 of which is serially connected to the interconnected stationary contacts of stepping switch 38. As soon as the first pulse of the first pulse train moves switch arm 36 off contact 40, the potential at terminal 42 is applied to coil 80 which, after a period of 5 to 7 seconds for example, closes its contact 82, to effect energization of solenoids 84 and 86. Solenoid 84 is mechanically connected to switch arms 36, 52 and 56, and solenoid 86 to switch arm 68, to move each of these switch arms to their full clockwise or off position illustrated. In other words, after each of the pulse trains has been received and a desired device energized to effect the apropriate warning signal, relay 78 operates to cause each of the stepping switch arms to return to their home or resting position, to await receipt of any further sets of pulse trains by receiver 14.

The telephone dial pulser 10 shown associated with the transmitter in the drawing, may effect any type of desired operation to obtain the pulse trains required. For example, a standard telephone dialing system with contacts opening, or with contacts closing, to effect transmission of a pulse, may be utilized, in connection with or without an effective inversion thereof to change from one to the other type. The make and break contacts of the dialer may be serially connected in the B+ line of the transmitter for example, or they may be associated with any other part of the transmitter, as in the output circuit of the transmitter oscillator so as to keep the oscillator output grounded except when the dial contacts are separated by dialing. Any other arrangement desired may be utilized in acordance with this invention.

Thus there has been disclosed a system which fully effects all of the advantages and objects herein mentioned. Modifications will become apparent to those of ordinary skill in the art after reading this disclosure, but limitation to the disclosed embodiments is not intended since the scope of the invention is to be determined by the appended claims.

What is claimed is:

1. A warning system for selectively operating any one of a multiplicity of different devices for effecting warning signals, comprising first and second stepping switches each having its own group of stationary contacts and contactable therewith a respective movable arm, each of said multiplicity of devices being connected between a said first switch stationary contact and a said second switch stationary contact so as to link a different set of first and second stationary contacts than any other of said devices, said arms being coupled to a source of energy for activating any one of said devices when said arms are moved into contact with the said set of stationary contacts between which that device is connected, means for producing a first pulse train having a variable number of pulses up to a given maximum pulse number and thereafter a second pulse train having a variable number of pulses for effectively designating any one of said contact sets to which a said device is connected by the number of pulses in each said train, first and second means responsive to said first and second pulse trains for causing the said arms of said first and second stepping switches respectively to step to the respective stationary contacts in the set thereof effectively designated by the pulse trains, a transfer relay having a set of transfer contacts respectively coupled to said first and second step causing means, and delay means coupled to said transfer relay and operative in response to the first pulse of the first pulse train to cause the first pulse train to be directed via the one of said transfer contacts that is connected to the said first step causing means and after a predetermined time delay, including the passage of time required for the said given maximum number of pulses in the first pulse train to expire, for causing said relay to direct the second pulse train via the other transfer contact that is connected to the said second step causing means.

2. A warning system as in claim 1 including a third stepping switch having its own group of stationary contacts and contactable therewith a respective movable arm which is mechanically connected to move with the movable arm of said first stepping switch, each of the said stepping switches having an off contact in each of its group of stationary contacts from which the respective movable arms move upon receipt of the first pulse in the respective pulse trains, each of the remaining stationary contacts of the said third stepping switch being connected together and serially with the aforesaid delay means for effecting energization of the transfer relay, and including means connected to those connected together contacts for returning each of the three stepping switch arms to said off contacts after a predetermined time following the receipt of said pulse trains.

3. A warning system as in claim 1 wherein said pulse train producing means includes a telephone dialing type pulser at a remote transmitter and a receiver for recovering the pulses dialed and transmitted.

References Cited by the Examiner

UNITED STATES PATENTS

| | | | |
|---|---|---|---|
| 1,055,929 | 3/13 | Long | 340—147 |
| 1,781,520 | 11/30 | Nessell | 340—147 |
| 2,577,283 | 12/51 | Stamper | 340—164 |
| 2,624,795 | 1/53 | Bodoh | 340—147 |
| 3,085,228 | 4/63 | Rockola | 340—147 |

NEIL C. READ, *Primary Examiner.*